United States Patent [19]

Bell et al.

[11] Patent Number: 5,193,261
[45] Date of Patent: Mar. 16, 1993

[54] METHOD FOR STUFFING A SNAILED ENDLESS RIBBON INTO A RIBBON CARTRIDGE

[75] Inventors: Jeffrey D. Bell, Murfreesboro; Franklin K. Smith, Unionville; Patrick D. Carter, Franklin, all of Tenn.

[73] Assignee: Pelikan, Inc., Franklin, Tenn.

[21] Appl. No.: 889,789

[22] Filed: May 28, 1992

Related U.S. Application Data

[62] Division of Ser. No. 666,386, Mar. 8, 1991, Pat. No. 5,136,778.

[51] Int. Cl.⁵ .............................................. B23P 11/00
[52] U.S. Cl. ........................................ 29/434; 53/430
[58] Field of Search ................ 29/434, 806, 281.1, 29/792; 242/55.19 A; 156/344, 584; 83/870, 874, 937; 400/196, 196.1, 207, 208; 53/118, 430

[56] References Cited

U.S. PATENT DOCUMENTS

| | | | |
|---|---|---|---|
| 3,623,775 | 6/1970 | Arseneault et al. | 400/196.1 X |
| 4,469,457 | 9/1984 | Chida et al. | 242/55.19 A |
| 4,749,293 | 6/1988 | Beer et al. | 400/196.1 X |
| 4,854,029 | 8/1986 | Smith et al. | 400/196.1 X |
| 4,864,710 | 9/1989 | Ogawa | 29/806 X |

FOREIGN PATENT DOCUMENTS 55-9808   1/1980   Japan .

OTHER PUBLICATIONS

IBM Technical Disclosure Bulletin, Bergacs et al., vol. 26, No. 12, May 1984.

Primary Examiner—Joseph M. Gorski
Assistant Examiner—S. Thomas Hughes
Attorney, Agent, or Firm—John F. A. Earley; John F. A. Earley, III

[57] ABSTRACT

A rotary table assembly apparatus for stuffing a snailed endless ribbon into a ribbon cartridge comprises a rotary table, a mounting plate affixed to the table for mounting and positioning a bottom housing of a ribbon cartridge, a loop tray affixed to the front portion of the mounting plate for holding a snailed loop while it is being stuffed into the ribbon cartridge, adjustable slide panels mounted on the loop tray to create narrow slits with a pin to hold the ribbon upright as it passes through the slits into the ribbon cartridge and to prevent more than one layer of ribbon from passing from the loop tray into the cartridge, and a cover for keeping the ribbon from jumping out of the loop tray as the ribbon is being fed into the cartridge. A method of stuffing an endless looped fabric ribbon into a ribbon cartridge which is used with a typewriter or a printer, comprises the steps of placing a ribbon which has been wound into a snailed loop into a loop tray, closing the top of the tray by placing a cover over it so that the ribbon cannot jump out of the tray while it is being rewound and stuffed into the ribbon cartridge, pressing a cartridge cover over the cartridge housing, and rewinding the ribbon to draw it from the loop tray and stuff it into the cartridge.

5 Claims, 3 Drawing Sheets

METHOD FOR STUFFING A SNAILED ENDLESS RIBBON INTO A RIBBON CARTRIDGE

This is a divisional of application Ser. No. 666,386, filed on Mar. 3, 1991, now U.S. Pat. No. 5,136,778, issued Aug. 11, 1992.

FIELD OF THE INVENTION

This invention relates to ribbon cartridges which are used in typewriters or printers, and more particularly concerns apparatus and method for stuffing a snailed endless ribbon into a ribbon cartridge.

DESCRIPTION OF THE PRIOR ART

Various prior art methods and apparatus are used to stuff a ribbon into a ribbon cartridge. One conventional method is to make a ribbon which is in the form of an endless loop and to wind that ribbon into a roll so that it looks like a snail with a roll portion with a free end extending from the roll. The bottom housing of a ribbon cassette is placed on a hand press plate beneath a hand press, and the snailed loop is placed on a fixture plate and the free end is threaded through the ribbon cartridge. The cover is placed on the cartridge housing, the hand press plate is slid forwardly to a position beneath the hand press, and the operator pulls the handle of the hand press to press the cartridge cover closed on the cartridge housing, with an outer end portion of the ribbon threaded inside the cartridge, and the major portion of the ribbon outside the cartridge.

The cartridge is then taken to a rewind station where it is hung on a wall plate with the ribbon loop extending downwardly in unwound condition. A driver at the rewind station rotates the drive wheel of the ribbon cartridge and winds the ribbon into the cartridge.

This conventional assembly station allows the operator to put all the components into the cartridge bottom housing and to close the cover, but it leaves the looped fabric ribbon hanging from the entry and exit arms of the ribbon cartridge. A separate rewind fixture must be employed by another operator at a separate winding station to rewind the ribbon loop into the ribbon cartridge. This requires two operations or two operators. Also, the loops may become tangled during the rewind operation or while the cartridges are being moved from the assembly station to the rewind station. Further, the ribbon may become crimped or folded and may cause a jamming problem during the rewind operation.

SUMMARY OF THE INVENTION

The present invention allows the operator at an assembly station to use a rotary table apparatus to assemble the parts of a ribbon cassette housing, press the cartridge cover onto the cartridge, and stuff a snailed loop of ribbon into the cartridge. This is especially effective for assembling ribbon cartridges of nylon fabric.

DETAILED DESCRIPTION OF THE DRAWINGS

Figure 1:
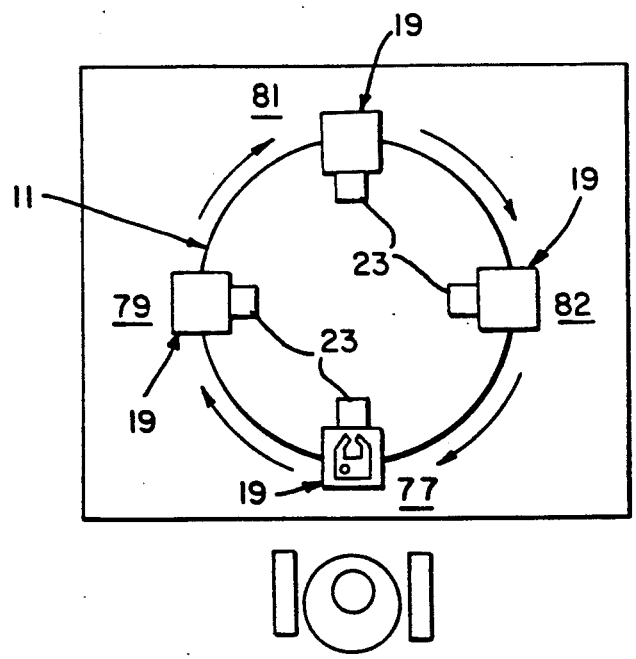
FIG. 1 is a view in top plan of rotary table assembly apparatus constructed in accordance with the invention.
Figure 2:
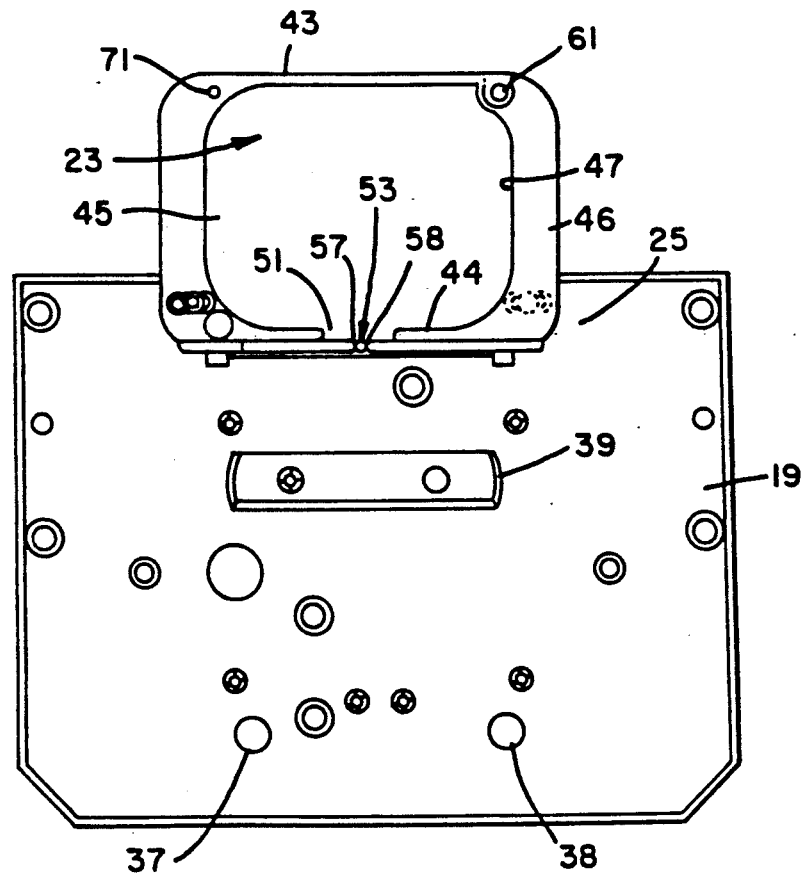
FIG. 2 is a view in top plan of a snail stuffing box assembly for stuffing a snailed ribbon into a ribbon cartridge and shows a mounting plate and a loop tray affixed to the front portion of the mounting plate.
Figure 3:
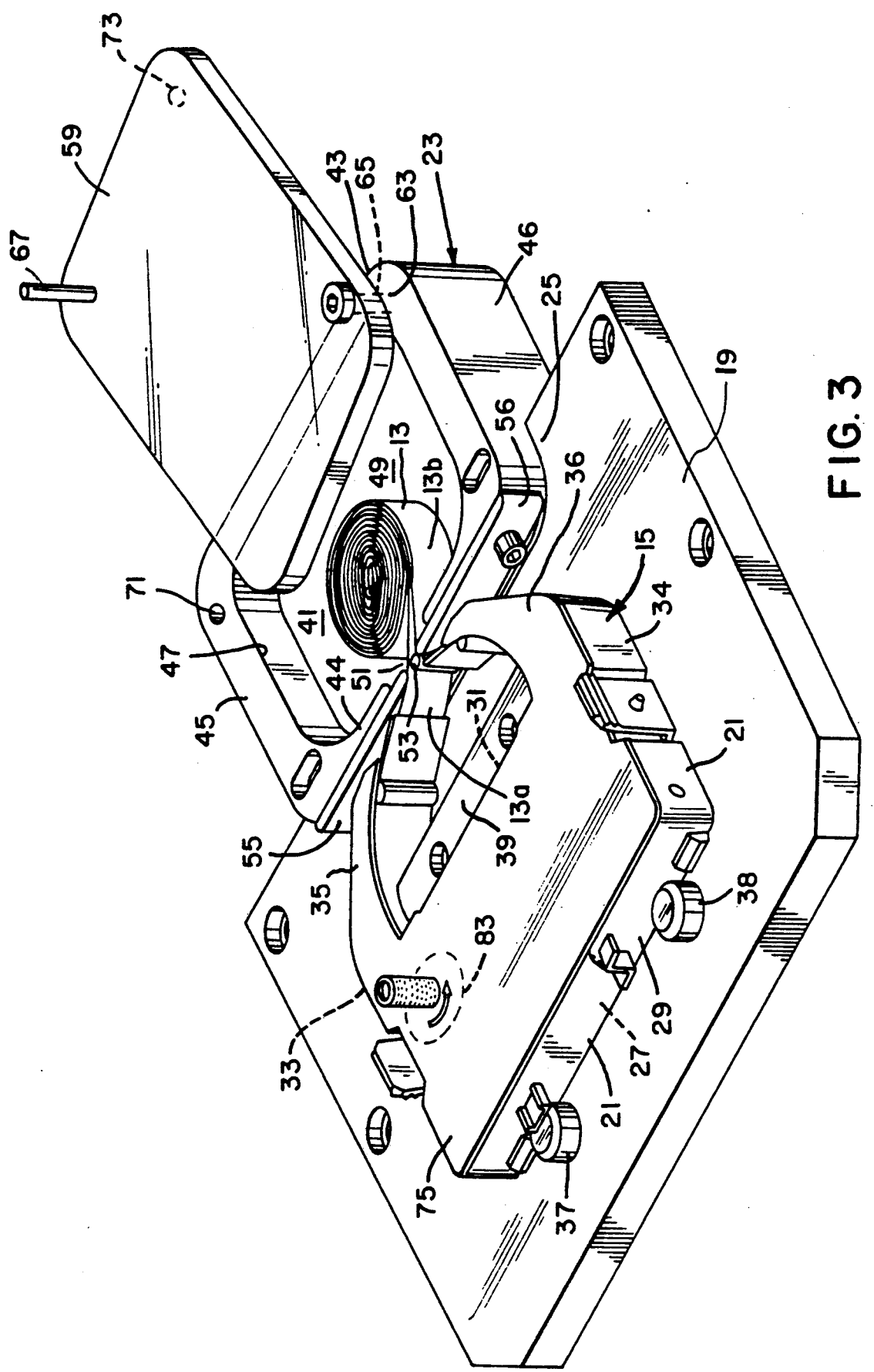
FIG. 3 is a perspective view of the mounting plate and the loop tray with a ribbon cassette mounted on the mounting plate and a snailed ribbon positioned in the loop tray with the free end of the ribbon having been threaded through the ribbon cassette.
Figure 4:
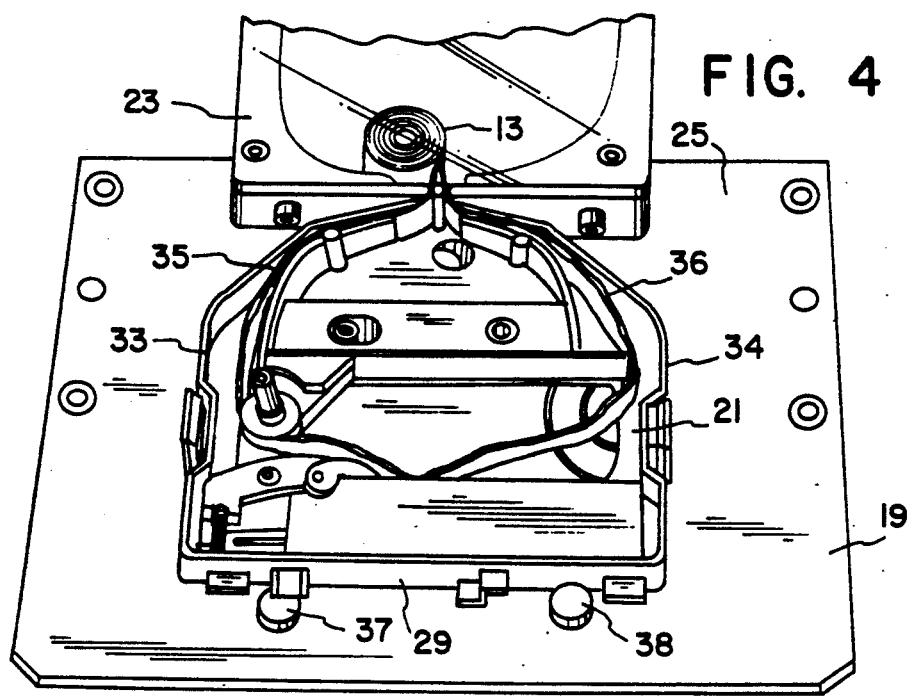
FIG. 4 is a view in top plan showing the free end of the loop threaded into the bottom housing of the ribbon cassette and showing the remaining portion of the/loop in the loop tray with the loop tray having its cover closed.
Figure 5:
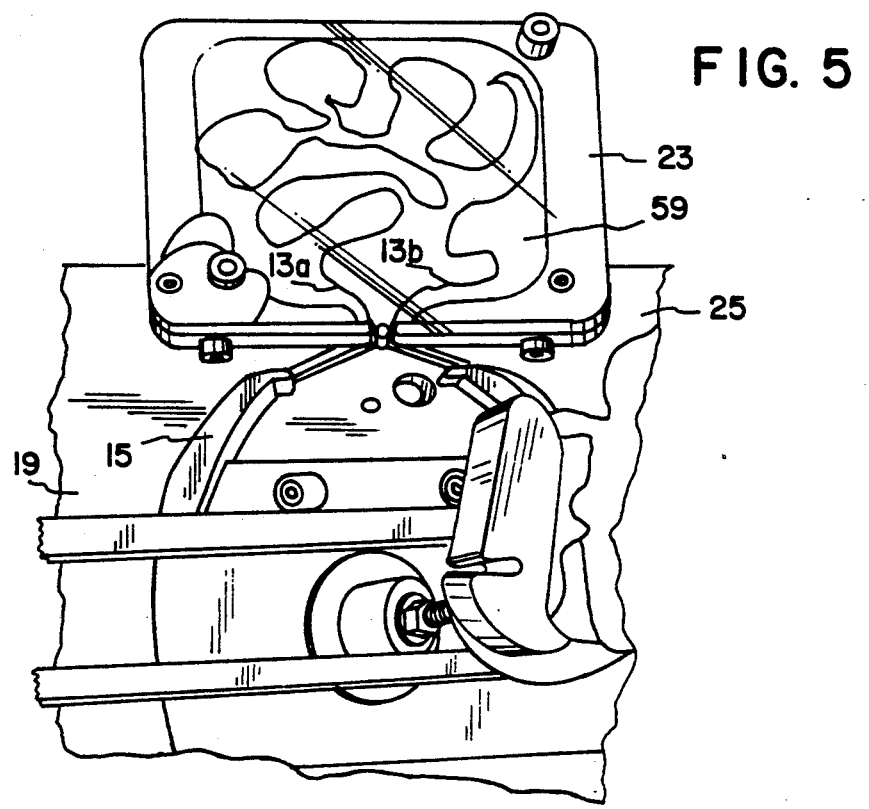
FIG. 5 is a view in top plan at a rewind station 3 and shows the loop being rewound into the ribbon cassette with the rewinding operation causing the ribbon in the loop tray to form a fan fold which assists in keeping the ribbon upright as it passes from the loop tray into the ribbon cassette.

Turning now to the drawings, there is shown a rotary table assembly apparatus 11 for stuffing a snailed endless ribbon 13 into a ribbon cartridge 15. The assembly apparatus 11 comprises a rotary table 17, a mounting plate 19 affixed to the table 17 for mounting and positioning a bottom housing 21 of the ribbon cartridge 15, and a loop tray 23 affixed to the front portion 25 of the mounting plate 19.

The cartridge bottom housing 21 has a bottom wall 27 and a rear wall 29 and a front wall 31 connected together by side walls 33, 34 and a pair of arms 35, 36 that extend forwardly from the side walls 33, 34 and the front wall 31.

Rear stop bumpers 37, 38 are mounted on plate 19 for positioning the rear wall 29 of the cartridge bottom housing 21, and a front stop bar 39 is provided on mounting plate 19 for positioning the front wall 31 and arms 35, 36 of the cartridge bottom housing 21 on the mounting plate 19.

The loop tray 23 has a bottom wall 41 and a front wall 43 and a rear wall 44 connected together by side walls 45, 46 and has an open top 47 to form a ribbon receiving chamber 49. An opening 51 is formed in the rear wall 44 of loop tray 23 to allow looped ribbon 13 to pass from the loop tray 23 to the cartridge housing 21.

A pin 53 is mounted in the opening 51 in the rear wall 44 to separate two runs 13a, 13b of the looped ribbon 13 as they pass from the loop tray 23 to the cartridge housing 21. Adjustable slide panels 55, 56 are slidably mounted on the rear wall 44 of the loop tray 23 to create narrow slits 57, 58 with the pin 53 to hold the ribbon upright as it passes through the slits 57, 58 and to prevent more than one layer of ribbon 13 from passing through each slit 57, 58 as it goes from the loop tray 23 into the cartridge 15.

A cover 59 is provided to cover the open top 47 of the loop tray 23 and to prevent the ribbon 13 from jumping out of the loop tray 23 as the ribbon 13 is being fed into the cartridge housing 21. The cover 59 is a clear plastic sheet, and has a post hole 61 in a front corner 63 which is seated on a pivot post 65 mounted on a front corner of the tray walls for allowing the cover 59 to rotate and slide over the open top 47 to close the chamber 49. A handle 67 is mounted on top of the cover 59 and is spaced away from the post hole 61 and is used to open and close the cover 59. Handle 67 may be a pin as shown or it may be preferably a larger and stronger bolt or screw that is threaded into cover 59.

A spring plunger 71 is mounted on top of the tray walls for contacting an indent 73 on the bottom surface of the cover 59 to hold the cover 59 in closed position.

In operation, the method of stuffing an endless looped fabric ribbon 13 into a cartridge 15 which is used with a typewriter or a printer comprises the steps of placing the bottom housing 21 of a ribbon cartridge 15 onto a mounting plate 19 of the rotary table assembly apparatus 11 which is positioned at a first station 77, placing a ribbon 13 which has been wound into a snailed loop into a loop tray 23 which is mounted on the rotary table 17 and is connected to the mounting plate 19, threading the ribbon 13 through two slits 57, 58 in the rear wall 44 of the tray 23 into the cartridge housing 21, threading the ribbon 13 through its proper course in the cartridge housing 21, closing the top 47 of the tray 23 by sliding tray cover 59 over it so that the ribbon 13 cannot jump out of the tray 23 while it is being rewound and stuffed into a ribbon cartridge bottom housing 21, placing a cartridge cover 75 onto the cartridge housing 21, indexing the cartridge 15 to a second station 79, pressing the cartridge cover 75 onto the cartridge housing 21 to close the cartridge 15, stamping a date on the cartridge, indexing the cartridge 15 to a third station 81, and rewinding the ribbon 13 and stuffing it into the cartridge 15 at third station 81.

The method also includes the steps of developing a fan fold of the ribbon 13 in the loop tray 23 as the snailed loop 13 rewinds into the cartridge 15 to keep the ribbon upright and untwisted and to prevent a double thickness of ribbon 13 from being fed through the loop tray 23. Also, the ribbon 13 is trained around a drive spool mounted in ribbon cartridge 15 and the drive spool 83 is rotated to rewind the ribbon 13 and stuff it into the cartridge 15.

After the ribbon 13 has been rewound into the cartridge 15 at station 3, the mounting plate 19 and loop tray 23 are indexed to station 82 which may be a pick-off station where the stuffed cartridge 15 may be picked off automatically by a pick-off arm.

Alternatively, the mounting plate 19 and loop tray 23 may be indexed to first station 77 where the operator picks off the stuffed cartridge 15 and places it into a basket which is delivered to another operator for further processing such as cleaning and packaging.

ADVANTAGES

During the rewind operation at station 3, the snailed ribbon loop 13 is unwound a it is drawn into the drive side of the cartridge 15. As the snailed loop unwinds, a fan fold develops inside the cartridge.

It is advantageous to use a snailed loop, which is an endless woven loop pre-inked and wound into a neat, smooth bundle, because it is easy to transport, handle, and assemble.

The present invention allows a mounting plate and loop tray to be mounted on four stations of a rotary table where one operator can assemble and stuff the ribbon cartridge instead of having one operator to assemble the cartridge and another operator to stuff the cartridge. This increases the efficiency and reduces assembly time and cost. The invention also produces a higher quality ribbon because it tends to eliminate folded or snagged ribbons and ink smudges on the finished product.

We claim:

1. A method of stuffing an endless looped fabric ribbon into a ribbon cartridge which is used with a typewriter or a printer, comprising the steps of
    placing a ribbon which has been wound into a snailed loop into a loop tray having an open top,
    closing the top of the tray by placing a tray cover over it so that the ribbon cannot jump out of the tray while it is being rewound and stuffed into a ribbon cartridge bottom housing,
    pressing a cartridge cover onto the cartridge housing,
    and rewinding the ribbon thereby drawing it from the loop tray and stuffing it into the cartridge.

2. The method of claim 1, including
    developing a fan fold of the ribbon in the loop tray as the snailed loop rewinds into the cartridge to keep the ribbon upright and untwisted and to prevent a double thickness of ribbon from being fed through the loop tray.

3. The method of claim 1,
    said ribbon cartridge having a drive spool, and including the steps of
    threading the ribbon around the drive spool,
    and rotating the drive spool to rewind the ribbon and stuff it into the cartridge.

4. A method of stuffing an endless looped fabric ribbon into a ribbon cartridge which is used with a typewriter or a printer, comprising the steps of
    placing a bottom housing of a ribbon cartridge onto a mounting plate of a stuffing box assembly which is mounted on a rotary table and is positioned at a first station,
    placing a ribbon which has been wound into a snailed loop into a loop tray having an open top and a rear wall which is mounted on the rotary table and is connected to the mounting plate,
    threading the ribbon through two slits in the rear wall of the tray into the cartridge housing,
    threading the ribbon through its proper course in the cartridge housing,
    closing the top of the tray by placing a tray cover over it so that the ribbon cannot jump out of the tray while it is being rewound and stuffed into a ribbon cartridge bottom housing,
    placing a cartridge cover onto the cartridge housing,
    indexing the cartridge to a second station,
    pressing the cartridge cover onto the cartridge housing to close the cartridge,
    stamping a date onto the cartridge,
    indexing the cartridge to a third station,
    and rewinding the ribbon thereby stuffing it into the cartridge.

5. The method of claim 4, including
    indexing the stuffed cartridge,
    and picking the stuffed cartridge off the rotary table.

* * * * *